United States Patent [19]
Gunkel et al.

[11] Patent Number: 5,989,509
[45] Date of Patent: *Nov. 23, 1999

[54] METHOD FOR EXTRACTING ANTIMONY FROM ELEMENTAL PHOSPHOROUS

[75] Inventors: Louis T. Gunkel, Yardley, Pa.; John Crosby, Lawrenceville; Theodore F. Munday, Kendall Park, both of N.J.; Paul J. Beck, Yardley, Pa.

[73] Assignee: EMC Corporation, Philadelphia, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/871,037

[22] Filed: Jun. 9, 1997

[51] Int. Cl.$^6$ ...................................................... C01B 25/04
[52] U.S. Cl. ............................................................. 423/322
[58] Field of Search ................................................ 423/322

[56] References Cited

U.S. PATENT DOCUMENTS

| | | | |
|---|---|---|---|
| 2,123,554 | 6/1938 | Klosky | 423/322 |
| 2,537,078 | 1/1951 | Miller | 423/322 |
| 3,515,515 | 6/1970 | Hinkebein | 423/322 |
| 3,645,789 | 2/1972 | Mandelkov et al. | 134/2 |
| 4,299,806 | 11/1981 | Kuck et al. | 423/322 |
| 4,462,973 | 7/1984 | Crea et al. | 423/322 |
| 4,761,271 | 8/1988 | Toy et al. | 423/322 |
| 5,670,126 | 9/1997 | Gunkel | 423/322 |

FOREIGN PATENT DOCUMENTS

| | | | |
|---|---|---|---|
| 699630 | 12/1964 | Canada | 423/322 |
| 763261 | 9/1980 | Russian Federation | 423/322 |
| 919989 | 4/1982 | Russian Federation | 423/322 |

*Primary Examiner*—Wayne Langel
*Attorney, Agent, or Firm*—Patrick C. Baker; Polly E. Ramstad; Anthony L. Cupoli

[57] ABSTRACT

A process for purifying elemental phosphorus that contains antimony using an oxidizer, such as hydrogen peroxide, peroxymonosulfate, peroxydisulfate, or a hypochlorite, in a two phase system containing water and phosphorus as the two liquids. A purified elemental phosphorus having 200 ppb or less antimony content.

22 Claims, No Drawings

«METHOD FOR EXTRACTING ANTIMONY FROM ELEMENTAL PHOSPHOROUS»

METHOD FOR EXTRACTING ANTIMONY FROM ELEMENTAL PHOSPHOROUS

FIELD OF THE INVENTION

This invention relates to the removal of a heavy metal from elemental phosphorus. More particularly, it concerns the production of an elemental phosphorus that contains a very low amount of antimony.

BACKGROUND OF THE INVENTION

Elemental phosphorus generally contains parts per million quantities of metals such as iron, arsenic, chromium, zinc, and antimony. The extent to which these metals are present in the phosphorus depends on the source of the phosphate ore that the phosphorus is extracted from and, to some extent, on the overall process used to produce and refine the elemental phosphorus. Of these metals, antimony has been most difficult to remove on an economical basis. Since a high antimony content can make the phosphorus unacceptable for use in certain food and electronics applications, it is important to develop a more economic method of removal.

This problem is perpetuated when elemental phosphorus is converted into phosphoric acid because the antimony in the phosphorus carries over into the phosphoric acid. Thus, in high value phosphoric acid products such as food grade acid and semiconductor grade acid, antimony can be a problem.

The problem is compounded by the fact that elemental phosphorus is not easy to work with. Because it spontaneously combusts when it is exposed to air, it is typically kept under a water blanket to prevent air contact. Because elemental phosphorus freezes at 44° C., it is typically kept at a higher temperature to keep the phosphorus fluid, so that it can be readily worked with, stored, and transported. To meet both these objectives, it is typically kept at a temperature above its melting temperature of 44° C. to facilitate handling, and below the boiling temperature of water to preserve the water blanket. Thus, elemental phosphorus is usually handled as a two phase system, consisting of a phosphorus layer that is covered by a layer of water.

Hydrogen peroxide has been shown to remove iron in an elemental phosphorus system that consists of three phases: a water phase, a phosphorus phase and an organic phase that consists of an organo halide solvent, such as carbon tetrachloride or trichloroethylene. In that somewhat complicated system, the water, phosphorus and organic solvent were mixed and the phosphorus was dispersed in a larger volume of organo halide solvent to facilitate reaction between the hydrogen peroxide and the iron contained in the phosphorus. The art has been silent as to the use of that process in systems containing antimony or in simple phosphorus and water systems.

SUMMARY

Surprisingly, it has been discovered that elemental phosphorus can be purified by providing a two phase liquid, elemental phosphorus system, composed of liquid water and liquid phosphorus but no other liquid, which co-exist as an aqueous phase and an antimony-containing phosphorus phase, dosing the system with an effective amount of an oxidizer selected from the group consisting of hydrogen peroxide, peroxydisulfate, peroxymonosulfate, caro's acid or a salt thereof, sodium, potassium or calcium hypochlorite to lower the concentration of antimony in the phosphorus phase, and agitating the resultant mixture to effect separation of the antimony from the phosphorus phase.

In another aspect, it has been discovered the purified elemental phosphorus that is so produced contains less than 200 ppb antimony.

DETAILED DESCRIPTION

Elemental phosphorus has many allotropic forms. The phosphorus of this invention, commonly termed "elemental phosphorus" has a melting point of about 44.1 ° C. and a boiling point of about 280.5° C. Such phosphorus is sometimes called white phosphorus in the text books because that is the color of the purified element. But, in the industry, it is commonly called yellow phosphorus, as that is, typically, the color of the industrially pure form.

Elemental phosphorus reacts spontaneously with air. Although phosphorus contact with air can be avoided by keeping the phosphorus in a vacuum or under an inert gas blanket, air contact is typically avoided through the use of a water blanket. because water is immiscible with, and less dense than phosphorus, it forms in a quiescent state a protective aqueous layer above the phosphorus that serves as an effective, economical interface that precludes phosphorus contact with air.

Antimony is intimately associated with the elemental phosphorus in the phosphorus phase. Although the exact manner in which antimony is bound to the phosphorus is unknown, it is connected in a manner that prevents the separation of the antimony and the phosphorus through mere water extraction or filtration.

Hydrogen peroxide is a water-soluble compound that is commercially available as an aqueous solution, typically of 5 wt % or 35 wt %. Because of its water solubility, the hydrogen peroxide added to the system tends to dissolve in the aqueous phase. As a consequence, the likelihood of a reaction occurring based on mere addition of the hydrogen peroxide to the aqueous phase is expected to be extremely low. It is further lowered by the fact that the antimony is present in extremely small amounts that are best measured and reported on a parts per million scale. Because of these factors, the likelihood of an effective contact between the hydrogen peroxide and the antimony containing phosphorus is, thus, extremely low, absent some other factor.

It has been determined that there are steps that can be taken to increase the likelihood of effective contact. One of these is to increase the level of agitation of the phosphorus system as much as possible to improve the degree of contact between the antimony and the hydrogen peroxide, while limiting the degree of agitation sufficiently to avoid having the phosphorus come in contact with, and reacting with, air.

As a rule, slow or poor mixing will prolong the time needed to remove the antimony. Optimum mixing as defined by safe engineering practices will decrease the time needed for the process to take effect and overly vigorous mixing will cause emulsions, sludge, and separation problems. Such mixing optimizes interfacial contact of the phosphorus and water phases to facilitate the purification process. Any device that generates sufficient agitation to mix the aqueous and phosphorus phases can be used: stirrers, mixers, a combination of baffles and circulating pumps, or other agitating devices that do not create an undue risk of bringing the phosphorus into contact with air. Preferably, the aqueous hydrogen peroxide or other oxidizers are brought into intimate contact with the antimony containing phosphorus through judiciously vigorous mixing. The term "agitating" is used to connote an intermixing of the phases that occurs within these guidelines.

Other oxidizers, such as peroxydisulfate, peroxymonosulfate, hypochlorous acid or its salt sodium hypochlorite also perform well in the process of this invention and can be substituted for hydrogen peroxide in the process of this invention. Peroxydisulfate, $S_2O_8^{-2}$, is available as the alkali, alkaline earth, and ammonium salt. Peroxymonosulfate, $SO_5^{-2}$ is available in the acid form, as caro's acid, $H_2SO_5$ and is also available under the DuPont trademark, OXONE® peroxymonsulfate in the form of the salt $2KHSO_5 \cdot KHSO_4 \cdot K_2SO_4$.

Increasing the hydrogen peroxide dosage also increases the effectiveness of the process by increasing the probability of contact of the hydrogen peroxide with the phosphorus phase. Although it is believed that the hydrogen peroxide reacts with antimony on a stoichiometric basis, it is generally desirable to have an excess of hydrogen peroxide relative to the antimony in order to facilitate the rate of the reaction. Thus, whether the reaction, in fact, is on a stoichiometric basis or not, the hydrogen peroxide is preferably used in excess.

Hydrogen peroxide works at any concentration; however, a concentration consistent with safe but reasonable productivity should be employed. Even at 0.1% hydrogen peroxide in the aqueous phase, significant reductions in antimony content of the phosphorus phase occur within a matter of hours. Although the peroxide concentration of the water phase is important, the number of moles of peroxide required to react with and remove a given number of moles of antimony in the phosphorus is also important, and either measure can be used to determine operating conditions and process results.

Because the hydrogen peroxide dosage required for the purification appears to be stoichiometric, a molar ratio of peroxide to antimony of at least one should be sufficient. But the very low (ppm range) concentration of antimony in the phosphorus necessitates a large molar excess to effect separation in a reasonable amount of time. A hydrogen peroxide to antimony mole ratio of 300/1, as a practical matter can produce satisfactory results within several hours. The purification rate improves as the concentration of hydrogen peroxide in the treating aqueous phase goes up (i.e., the molar ratio of $H_2O_2$/Sb ratio goes up). The preferred molar ratios are a ratio of a least 1000:1 and a ratio within the range of 1000:1 to 3000:1 since these permit purification within three hours.

For practical reasons, an aqueous phase having 0.1 to 5 wt % $H_2O_2$ can be used effectively, although 0.3 to 2% is preferred, and 0.5 to 1% is most preferred. High concentrations of peroxide can be used and if used would promote faster removal of the antimony. But for practical cost and safety reasons the preferred ranges have been provided herein. In a typical aqueous phase to phosphorus weight ratio of 4/1, a concentration of 0.5 percent hydrogen peroxide is sufficient to remove the antimony in about two hours. At this level, the mole ratio of $H_2O_2$ to antimony in the phosphorus is about 2000 to 1. Concentrations higher than this at the same ratio of aqueous phase to total phosphorus do not improve the process by very much, if at all. Of course the concentration of $H_2O_2$ can be increased by simply reducing the amount of water in the aqueous phase of the system. In this manner the number of moles of $H_2O_2$ used can be held to a constant or minimized, while the volume of the overall aqueous phase can be reduced. For safety and phosphorus recovery reasons, it is preferred to keep the concentration of the $H_2O_2$ below five percent and preferably below 3.0 percent.

Controlling the temperature of the phosphorus system is critical during the purification process, since the purification cannot proceed efficiently with solid phosphorus. Thus, the temperature must be kept above 44.1 ° C., the melting temperature of phosphorus. Moreover, the boiling point of water must not be exceeded, where water is used as the air excluding barrier. Otherwise, the phosphorus can contact air. Given these constraints, a reasonable mixing temperature is within the range of from 45–90° C. while operating at atmospheric pressure. However, the preferred operating range is 50–70° C. and the most preferred range is 50–60° C. Of course, if a different air excluding barrier is used, then the preferred temperature ranges, although they may differ from those provided herein, can be readily determined.

The length of time needed to remove the antimony from a portion of phosphorus is dependent upon the concentration of hydrogen peroxide in the water phase, the temperature of the system, and the degree of mixing that the phosphorus and the aqueous phase containing the hydrogen peroxide are subjected to. The better the mixing or contact between the phosphorus and the hydrogen peroxide in the aqueous phase, the quicker the process will work and cause the antimony to oxidize and transfer into the aqueous phase. Therefore, the best mixing consistent with good chemical engineering practices is recommended. The examples provided herein demonstrate that it is possible to reduce the antimony levels in elemental phosphorus from 40–50 ppm or higher to less than the detectable limits used in good laboratory practices (i.e. <0.1–0.2 ppm) by this process in a reasonable time period with proper mixing.

Using the above method, a significant reduction in antimony occurs. Reductions of at least 80, 95 or 98 percent are easily obtained. Typically, the reductions exceed 99.5%. The purified phosphorus typically contains <0.1–0.2 ppm antimony. This is the lower detectable limit for the graphite furnace/Atomic Absorption test used. Based on these results, the phosphorus purified according to the method can contain 200 ppb or less of antimony and can contain 100 ppb or less.

Notably, very little phosphorus is consumed in the process. Under the conditions described herein, typically recovery rates for the phosphorus are greater than 98%. Phosphorus recovery rates of at least 93% were obtained in all of the tests conducted. Generally rates lower than 98% were due to factors such as experimental error or not taking into account carryover into the aqueous phase.

Except for the oxidizer consumed during the purification process, very little oxidizer appears to be consumed by the process. Since, oxidizer usage during the process appears stoichiometric based on the analyses of the aqueous phase during the three hour extraction period, the peroxide solutions can be reused with only a small make up of peroxide being necessary until the build up of antimony in the aqueous phase becomes high enough to significantly affect the separation. By routine testing for antimony, schedules can be established for replenishing the water used for the aqueous phase.

It is noteworthy that using dilute hydrogen peroxide to treat phosphorus, as described herein, always enhanced the appearance of the phosphorus. It lightened the color of the phosphorus and it provided a clearer product, presumably by reacting with insoluble organics that are present to a small extent in the phosphorus. Although these phenomena have not been quantified, these are values that are desired by phosphorus purchasers.

EXAMPLES

EXPERIMENTAL

Durox™ grade 35 percent hydrogen peroxide was used in the experiments. Durox is a trademark of FMC Corporation.

Two types of aqueous phases were studied in this work. One used deionized water and simply added the hydrogen peroxide to it to form the aqueous phase. The pH of this phase was usually 5–6 at the start of the test and then would quickly drop to ~2 as the hydrogen peroxide would react with a very small amount of the phosphorus to form some phosphoric acid. All of the initial scouting experiments were done using clean deionized water.

The other aqueous solution used was a sample of "phossy water." Phossy water is that water used in phosphorus production plants to cover phosphorus under storage, shipping, and transfer conditions. Because this water usually has phosphorus as well as other materials dissolved in it as a result of being in contact with phosphorus, it is segregated and reused in applications such as replacing phosphorus in rail cars when the phosphorus is pumped out at a user's facility.

There were no startling differences observed in going from one aqueous solution to the other as far as the process of removing antimony from phosphorus was concerned. The phossy water did have more impurities in it but those impurities did not hinder the removal of antimony. The hydrogen peroxide was less stable in the phossy water than it was in the de-ionized water but it was stable enough over an eight hour period to accomplish the extraction process. The phossy water containing ~2.6% hydrogen peroxide was tested with and without 316 stainless steel coupons present in the liquid and vapor spaces and there was no difference in peroxide stability due to the presence of the stainless steel.

All of the experiments carried out in this work except No. 8 were conducted in the apparatus described below:

See-through components were chosen, so that the extraction process could be viewed. A PLEXIGLAS® bath 18 inches long by 13 inches wide and 7 inches deep was set in a larger stainless steel tray in a fume hood. A glass beaker was used as the vessel for the extraction to take place in. This beaker was a 300 milliliter capacity PYREX® glass Model 1060 whose inside measurement was 60 mm, (2.36 inches) wide in diameter and 11.40 mm deep, (4.5 inches).

An isothermal immersion circulator supplied circulation and heat to the water in the bath. A 316 SS propeller type stirrer on a ¼ inch stainless steel shaft was used for mixing the water and the phosphorus. The propeller had three blades, each blade was ~½ inch in diameter, with an overall stirrer radius of ~1.5 inches. The stirrer speed used for most of the tests was 300 RPM.

Example No. 1

Using the apparatus described above, 100 milliliters of water were charged to a beaker and heated to 60° C. Forty-three and one tenth grams of elemental phosphorus (P4) were then added to the water in the beaker. The P4 melted and fell to the bottom of the beaker. The stirrer was then started at 300 RPM and 40 grams of 10.9% hydrogen peroxygen solution were added to the water phase of the mixture ($H_2O_2$ final strength ~3.1% in aqueous phase in the beaker). The mixture was stirred for three hours at temperature and then the phosphorus was sampled with a syringe and analyzed.

|  | Antimony |
| --- | --- |
| P4 Analysis initially | 47 PPM |
| P4 Analysis after 3 hours | <0.2 PPM |

Example No. 2

Using the apparatus described above, 100 milliliters of water were charged to a beaker and heated to 60° C. Forty and one half grams of elemental P4 were then added to the beaker containing the water. The P4 melted and fell to the bottom of the beaker. The stirrer was then started at 300 RPM and 40 grams of 10.9% hydrogen peroxygen solution were added to the water phase of the mixture ($H_2O_2$ final strength ~3.1% in aqueous phase in the beaker). The mixture was stirred for three hours at temperature and then the phosphorus was sampled with a syringe and analyzed.

|  | Antimony |
| --- | --- |
| Sb Analysis Initially | 47 PPM |
| Sb after 3 hours | <0.1 PPM |

Example No. 3

The apparatus described above was charged with the following:

146.0 grams of water 34.75 grams of phosphorus 20.59 grams of an aqueous $H_2O_2$ solution of 10.9 percent concentration Procedure: The water was added to a beaker and the beaker was then placed in the 60° C. bath. The phosphorus was then added and allowed to melt then the stirrer was inserted and started at 300 rpm. The hydrogen peroxide was then added to the mix and the test was started.

Run Data

| Time | pH | % $H_2O_2$ |
| --- | --- | --- |
| 0 min | 6.0 | 1.47 |
| 60 min | 5.0 | 1.48 |
| 120 min | 5.0 |  |
| 170 min | 4.0 | 1.50 |

The run was stopped after three hours. The beaker containing the P4 was removed from the bath and cooled in an ice bath. The treated phosphorus and aqueous phases were separated and weighed. The recovered phosphorus weighed 33.72 grams (97.1% recovery) and the aqueous layer weighed 132.44 grams.

The analysis of the two samples showed less than 0.1 ppm antimony in the phosphorus after treatment.

| Analysis (ppm) | Initial P4 | Final P4 | Aqueous Phase |
| --- | --- | --- | --- |
| Antimony | 42 ppm | <0.1 ppm | 9.2 ppm |
| Phosphorus |  |  | 3200 ppm |

At test completion, 99.7 percent of the antimony had been removed from the elemental phosphorus and transferred into the aqueous phase. Based on the level of phosphorus in the aqueous phase, the amount of phosphorus lost was 1.2 percent or phosphorus yield was 98.8 percent. The treated phosphorus was clear and white.

Example No. 4

The apparatus described above was charged with the following:

150.01 grams of water 30.66 grams of phosphorus 5.00 grams of an aqueous $H_2O_2$ solution of 35% concentration Procedure: $H_2O_2$ was added to a beaker that contained the water, and then the beaker was placed in a 60° C. bath. The phosphorus was then added and allowed to melt before the stirrer was inserted and started at 300 rpm. The mixture was stirred for three hours. The following data were recorded.

Run Data

| Time | pH | % $H_2O_2$ |
|---|---|---|
| 0 min | 6.0 | 1.26 |
| 60 min | 5.5 | 1.24 |
| 120 min | 5.0 | 1.27 |
| 180 min | 3.5 | 1.22 |

The run was stopped after three hours. The beaker containing the P4 was removed from the bath and cooled in an ice bath. The treated phosphorus was separated from the aqueous phase and weighed. The recovered phosphorus weighed 30.20 grams (98.5% recovery).

The analysis of the sample showed less than 0.2 ppm antimony in the phosphorus after treatment.

| Analysis (ppm) | Initial P4 | Final P4 | Aqueous Phase |
|---|---|---|---|
| Antimony | 42 ppm | <0.2 ppm | 12 ppm |
| Phosphorus | | | 3900 ppm |

At test completion, 99.3 percent of the antimony had been removed from the elemental phosphorus and transferred into the aqueous phase. Based on the level of phosphorus in the aqueous phase, the amount of phosphorus lost was 1.4 percent or phosphorus yield was 98.6 percent. The treated phosphorus was clear and white.

Example No. 5

The apparatus described above was charged with the following:

150.0 grams of water, 31.91 grams of phosphorus 14.95 grams of an aqueous $H_2O_2$ solution of 10.9% concentration Procedure: The water was added to a beaker and the beaker was then placed in the 60° C. bath. The phosphorus was added and allowed to melt before the stirrer was inserted and started at 300 rpm. The hydrogen peroxide was then added to the mix and the test was started.

Run Data

| Time | pH | % $H_2O_2$ |
|---|---|---|
| 0 min | | 1.10 |
| 60 min | 5.5 | 1.06 |
| 120 min | 5.0 | 1.12 |
| 180 min | 4.0 | 1.21 |

The run was stopped after three hours. The beaker containing the P4 was removed from the bath and cooled in an ice bath. The treated phosphorus was separated from the aqueous phase and weighed. The recovered phosphorus weighed 31.37 grams (98.3% recovery), and the aqueous layer weighed 118.66 grams.

Analysis showed less than 0.2 ppm antimony in the phosphorus after treatment.

| Analysis (ppm) | Initial P4 | Final P4 | Aqueous Phase |
|---|---|---|---|
| Antimony | 42 ppm | <0.2 ppm | 12 ppm |
| Phosphorus | | | 3600 ppm |

At test completion, 99.3 percent of the antimony had been removed from the elemental phosphorus and transferred into the aqueous phase. Based on the level of phosphorus in the aqueous phase, the amount of phosphorus lost was 1.3 percent or phosphorus yield was 98.7 percent. The treated phosphorus was clear and white.

Example No. 6

The apparatus described above was charged with the following:

150.93 grams of water 29.60 grams of phosphorus 7.44 grams of an aqueous $H_2O_2$ solution of 10.9% concentration Procedure: The water was added to a beaker and the beaker was then placed in the 60° C. bath. The phosphorus was added to the beaker and allowed to melt before the stirrer was inserted and started at 300 rpm. The hydrogen peroxide was then added to the mix and the test was started.

Run Data

| Time | pH | % $H_2O_2$ |
|---|---|---|
| 0 min | 6.0 | 0.58 |
| 60 min | 6.0 | 0.54 |
| 120 min | | 0.54 |
| 170 min | 4.0 | 0.52 |

The run was stopped after three hours. The beaker containing the P4 was removed from the bath and cooled in an ice bath. The treated phosphorus and aqueous phase were separated and weighed. The recovered phosphorus weighed 29.61 grams (100% recovery).

The analysis of the sample showed less than 0.2 ppm antimony in the phosphorus after treatment.

| Analysis (ppm) | Initial Sb | Final Sb |
|---|---|---|
| Antimony | 42 | <0.2 ppm |

P4 recovery=100%

At test completion, 99.3% of the antimony had been removed and the elemental phosphorus solution appeared clear.

Example No. 7

The apparatus described above was charged with the following:

100 grams of water 26.28 grams of phosphorus 1.0 grams of an aqueous $H_2O_2$ of 10.9% concentration Procedure: The water was added to beaker, which was then placed in a 60° C. bath. The phosphorus was added and allowed to melt before the stirrer was inserted and started at 300 rpm. One gram of $H_2O_2$ was then added and the test started.

Run Data

| Time | % H₂O₂ |
|---|---|
| 0 min | 0.10 |
| 40 min | |
| 120 min | |

The run was stopped after two hours. The beaker containing the P4 was removed from the bath and cooled in an ice bath. The P4 was removed and weighed and analyzed.

24.48 grams P4 recovered 107.40 grams of aqueous phase recovered

| Analysis (ppm) | In Starting P4 | In Final P4 | In Aqueous Phase |
|---|---|---|---|
| Antimony | 42 ppm | 6.5 ppm | 11.0 ppm |
| Phosphorus | | | 0.04% |

Percent Sb removed from P4=91% Percent Sb found in Aqueous Phase=89.9% P4 recovery based on P4 in Aqueous Phase=99.84%

At test completion, 84.5% of the antimony had been removed and the elemental phosphorus solution appeared clear. This test demonstrates that even low amounts of hydrogen peroxide remove antimony.

Example No. 8

A two liter fluted resin kettle, equipped with efficient stirring and a nitrogen padding system to keep air from the reactor, was charged with the following:

Charge:

500.00 grams of water 350.00 grams of phosphorus 16.00 grams of an H2O₂ solution of 35% concentration Procedure: The water was added to the two liter resin flask. The flask was then placed in a 60° C. bath. The phosphorus was added and allowed to melt before the stirrer was inserted and started at 600 rpm. The hydrogen peroxide was then added to the mix and the test was started. The phosphorus phase was sampled during the test at 15, 45 and 105 minute intervals to check the degree of antimony extraction over time. The results are tabulated below.

Run Data

| Time | % H₂O₂ | PPM Antimony in P4 |
|---|---|---|
| 0 min | 1.08% | 42 |
| 15 min | 1.09% | 9.7 |
| 45 min | 0.97% | 0.66 |
| 105 min | 0.80% | <0.2 |

The run was stopped after 105 minutes when the antimony level in the phosphorus dropped to <0.2 ppm.

Example No. 9

Using the procedure of Example 1, the following oxidizing agents were tested for their efficacy in treating elemental phosphorus. The charges were added to a 300 ml beaker and stirred at 60° C. for several hours, after which the phosphorus and aqueous phases were separated and analyzed.

| | $Na_2S_2O_8$ | $SO_4^{-2}$* | NaOCl |
|---|---|---|---|
| P4 Charge | 30 grams | 30 grams | 29.6 grams |
| Water | 150 grams | 150 grams | (with hypochlorite) |
| Oxidant | 20 grams | 54 grams | 250 grams |
| Sb (original) | 40 ppm | 40 ppm | 40 ppm |
| Sb (final) | 13 ppm | <0.1 ppm | <0.1 ppm |

* As $2KHSO_5KHSO_4K_2SO_4$ (Oxone ® peroxymonosulfate)

We claim:

1. A process for purifying elemental phosphorous, the process comprising the steps of:

(A) agitating a two phase system, wherein:
      the two phase system consists essentially of a water phase and a phosphorous phase,
      the water phase and the phosphorous phase are both liquids,
      the phosphorous phase comprises antimony-containing elemental phosphorous,
      the water phase comprises at least an effective amount of hydrogen peroxide; and (B) separating the water phase from the phosphorous phase.

2. The method of claim 1 in which the resulting phosphorous comprises less than 0.2 ppm of antimony.

3. The method of claim 1 in which the resulting phosphorous comprises less than 0.1 ppm of antimony.

4. The method of claim 1 in which the hydrogen peroxide comprises 0.1 to 5 wt % of the water phase.

5. The method of claim 4 in which the resulting phosphorous comprises less than 0.2 ppm of antimony.

6. The method of claim 5 in which the hydrogen peroxide comprises 0.3 to 2 wt % of the water phase.

7. The method of claim 6 in which the hydrogen peroxide comprises 0.5 to 1 wt % of the water phase.

8. The method of claim 1 in which the antimony-containing elemental phosphorous comprises at least 40 ppm of antimony.

9. The method of claim 8 in which the hydrogen peroxide comprises 0.1 to 5 wt % of the water phase.

10. The method of claim 9 in which the resulting phosphorous comprises less than 0.2 ppm of antimony.

11. The method of claim 1 in which the temperature of the two phase system is maintained between 50° C. and 70° C. and agitation is carried out for at least one hour.

12. The method of claim 11 in which the hydrogen peroxide comprises 0.1 to 5 wt % of the water phase, and the resulting phosphorous comprises less than 0.2 ppm of antimony.

13. The method of claim 11 additionally comprising, following step (B), the step of adding the water phase to a new batch of antimony-containing phosphorous.

14. The method of claim 13 in which the water phase comprises phossy water.

15. The method of claim 1 additionally comprising, following step (B), the step of adding the water phase to a new batch of antimony-containing phosphorous.

16. The method of claim 15 in which the hydrogen peroxide comprises 0.1 to 5 wt % of the water phase, and the resulting phosphorous comprises less than 0.2 ppm of antimony.

17. The method of claim 16 in which the water phase comprises phossy water.

18. The method of claim 1 in which the water phase comprises phossy water.

19. The method of claim 18 in which the hydrogen peroxide comprises 0.1 to 5 wt % of the water phase, and the resulting phosphorous comprises less than 0.2 ppm of antimony.

20. The method of claim 1 in which the hydrogen peroxide to antimony mole ratio is at least 300:1.

21. The method of claim 20 in which the hydrogen peroxide comprises 0.1 to 5 wt % of the water phase, and the resulting phosphorous comprises less than 0.2 ppm of antimony.

22. The method of claim 1 in which the hydrogen peroxide to antimony mole ratio is 1000:1 to 3000:1.

* * * * *

UNITED STATES PATENT AND TRADEMARK OFFICE
CERTIFICATE OF CORRECTION

Page 1 of 2

PATENT NO. : 5,989,509
DATED : November 23, 1999
INVENTOR(S) : L. T. Gunkel, et al.

It is certified that error appears in the above-identified patent and that said Letters Patent is hereby corrected as shown below:

On the cover page [54] replace "PHOSPHOROUS" with --PHOSPHORUS--.

On the cover page replace [73]Assignee: " EMC Corporation" with --FMC Corporation--.

In Claim 1, lines 1, 5, 6, 8, 9, and 12 replace "phosphorous" with --phosphorus--.

In Claim 2, lines 1 and 2 replace "phosphorous" with --phosphorus--.

In Claim 3, lines 1 and 2 replace "phosphorous" with --phosphorus--.

In Claim 5, lines 1 and 2 replace "phosphorous" with --phosphorus--.

In Claim 8, line 2 replace "phosphorous" with --phosphorus--.

In Claim 10, lines 1 and 2 replace "phosphorous" with --phosphorus--.

In Claim 12, line 3 replace "phosphorous" with --phosphorus--.

In Claim 13, line 3 replace "phosphorous" with --phosphorus--.

In Claim 15, line 3 replace "phosphorous" with --phosphorus--.

In Claim 16, line 3 replace "phosphorous" with --phosphorus--.

In Claim 19, line 3 replace "phosphorous" with --phosphorus--.

UNITED STATES PATENT AND TRADEMARK OFFICE
CERTIFICATE OF CORRECTION

PATENT NO. : 5,989,509
DATED : November 23, 1999
INVENTOR(S) : L. T. Gunkel, et al.

It is certified that error appears in the above-identified patent and that said Letters Patent is hereby corrected as shown below:

In Claim 21, line 3 replace "phosphorous" with --phosphorus--.

Signed and Sealed this

Nineteenth Day of September, 2000

Q. TODD DICKINSON

*Attest:*

*Attesting Officer*   *Director of Patents and Trademarks*

UNITED STATES PATENT AND TRADEMARK OFFICE
CERTIFICATE OF CORRECTION

PATENT NO. : 5,989,509
APPLICATION NO. : 08/871037
DATED : November 23, 1999
INVENTOR(S) : Gunkel et al.

It is certified that error appears in the above-identified patent and that said Letters Patent is hereby corrected as shown below:

At column 10, lines 22-23, delete the text "comprises at least an effective amount of hydrogen peroxide" and add -- consists essentially of water and an amount of hydrogen peroxide effective to lower the concentration of antimony in the phosphorous phase --.

Signed and Sealed this

Fourth Day of September, 2007

JON W. DUDAS
*Director of the United States Patent and Trademark Office*